United States Patent [19]

Richardson et al.

[11] Patent Number: 4,459,397

[45] Date of Patent: Jul. 10, 1984

[54] MODIFIED POLYETHER POLYOL FOR PREPARATION OF POLYURETHANE POLYMER

[75] Inventors: Thomas Richardson; David M. Burrington; Kollengode R. Viswanathan, all of Madison, Wis.

[73] Assignee: Wisconsin Alumni Research Foundation, Madison, Wis.

[21] Appl. No.: 488,423

[22] Filed: Apr. 25, 1983

[51] Int. Cl.³ .................. C08G 83/00; C08G 18/14
[52] U.S. Cl. ................................. 527/300; 527/312; 521/163; 252/182
[58] Field of Search .............. 527/300, 312, 313, 315; 521/67, 163, 164, 188; 252/182

[56] References Cited

U.S. PATENT DOCUMENTS 4,246,146  1/1981  Wood et al. .................... 524/14
4,335,219  6/1982  Clarke et al. .................. 521/128
4,379,757  4/1983  Baskent et al. ................. 521/118

Primary Examiner—John Kight, III
Assistant Examiner—Nathan M. Nutter
Attorney, Agent, or Firm—Isaksen, Lathrop, Esch, Hart & Clark

[57] ABSTRACT

A modified polyether polyol for use in the manufacture of polyurethane polymer having improved fire-resisting qualities, and the method for making such a polyether polyol. The modified polyether polyol includes a polyether polyol having urea chemically bound thereto. The method for making the modified polyether polyol includes reacting a reducing sugar with propylene oxide to produce a polyether polyol, which is then reacted with unsubstituted urea to chemically bind the urea thereto to produce a modified polyether polyol.

18 Claims, No Drawings

MODIFIED POLYETHER POLYOL FOR PREPARATION OF POLYURETHANE POLYMER

TECHNICAL FIELD

The present invention relates to polyurethane polymers having improved fire resisting qualities, and, in particular, to a modified polyether polyol for use in the manufacture of such polymers.

BACKGROUND OF PRIOR ART

Polyurethane polymers are conventionally prepared by the reaction of an organic polyol or polyether polyol with an organic polyisocyanate. It is conventional to produce a polyether polyol to be used in manufacturing polyurethane polymers from sugars. Sucrose is frequently used for this purpose because of its availability and low cost. Lactose from whey has been shown to be usable in making polyurethane foams. See Richardson et al, U.S. Pat. Nos. 3,629,162 and 3,658,731. However, lactose undergoes side reactions when heated under basic conditions, as must be done as part of the synthesis of a polyether polyol therefrom. The reaction products include compounds that make the polyether polyol dark in color, leading to dark polymer preparations unsuitable for many applications.

Foamed polyurethane polymers are widely used for various purposes. A disadvantage of such polyurethane foams is their flammability. It is necessary to add compounds of phosphorus, halogen containing compounds, or other materials to cause the foams to be self-extinguishing or non-burning. Urea has been mechanically mixed with polyurethane foams to produce a self-extinguishing foam. Hesskamp, U.S. Pat. No. 3,717,597 discloses a self-extinguishing composite material including bits of polyurethane foam mechanically mixed with urea and bound together to form a self-extinguishing, composite material. However, difficulties have been encountered when attempts have been made to incorporate granular urea in polyurethane foams by mechanically mixing it with a conventional polyol prior to use of the polyol. When it is necessary to move the liquid polyol and dispersed granular urea through pumps, pipes, nozzles, and the like, the urea increases the likelihood of the system stopping up and leads to abrasion and increased wear of such parts as pumps and nozzles.

Reymore, et al., U.S. Pat. No. 3,420,787 teaches a process for producing fire-retardant polyurethanes by incorporating in the polymerization reaction mixture a substituted urea having the formula

wherein Ar represents an aromatic hydrocarbon residue having a valancy n which is substituted by from 0 to 4 halogen atoms, $R_1$ and $R_2$ each represent lower-hydroxyalkyls, and n is an integer from 1 to 3, inclusive. Richter, et al., U.S. Pat. No. 4,154,931 discloses the preparation of cyclic ureas declared to be useful as cross-linkers and extenders in polyurethane formulations, although their effect on flammability is not disclosed. For the most part, such materials and other conventional flame retardants are relatively expensive, increasing the cost of fire resistant polyurethane polymers. Antimony oxide powder is a less expensive but still effective fire retardant when mixed through the bulk of a polyurethane foam. However, loose particles of the antimony oxide render the foam powdery, which is an unsatisfactory quality in many applications.

BRIEF SUMMARY OF THE INVENTION

The invention is summarized in that a method for making a modified polyether polyol for use in the manufacture of polyurethane polymer having improved fire resisting qualities includes the steps of reacting a reducing sugar with propylene oxide to produce a polyether polyol and reacting the polyether polyol with urea to chemically bind the urea thereto to produce a modified polyether polyol. The invention is further summarized in that a modified polyether polyol for use in the manufacture of polyurethane polymer having improved fire resisting qualities includes a polyether polyol having urea chemically bound thereto. "Urea" shall be understood herein to refer to unsubstituted urea.

A primary object of the invention is to provide a modified polyether polyol such that a polyurethane polymer manufactured therefrom has improved fire resisting qualities.

A second object of the invention is to provide for the economical making of the modified polyether polyol by utilizing inexpensive and plentiful ingredients therefor.

Yet another object of the invention is to produce such a polyether polyol having a low viscosity to allow convenient handling in the processing of the polyether polyol and in the manufacture of polyurethane polymers therefrom.

Yet another object of the invention is to produce a polyurethane polymer from a lactose-based polyol lighter in color than polymers conventionally produced from such a polyol.

A further object of the invention is to produce a fire resistant polyurethane foam in which only reduced amounts of commonly added phosphorus or halogen containing flame retardants are necessary to attain non-burning characteristics, without the need to add other ingredients that produce dusting or other undesirable physical characteristics.

Yet another object of the invention is to incorporate urea in a polyether polyol, and thereby in the polyurethane polymer made therefrom, without the incorporation of granular urea in such a way that nozzles and other handling devices for moving or processing the polyether polyol are subjected to stoppage or abrasion from the granular urea.

A further object of the invention is to provide a productive and practical use for surplus whey resulting from cheese manufacture.

Other objects, features, and advantages of the invention will be apparent from the following detailed description of the invention. The examples included therein and set forth below are included by way of illustration and not by way of limitation.

DETAILED DESCRIPTION OF THE INVENTION

In general terms, the invention includes reacting a reducing sugar with propylene oxide in conventional ways to produce a polyether polyol suitable for the making of polyurethane polymer. The polyether polyol is then modified by reacting it with urea so that the urea is neither merely mixed mechanically with the polyether polyol nor dissolved in it but is chemically bound to it, producing a modified polyether polyol. No solid urea remains to stop up fluid handling equipment or cause excessive wear to nozzles or pumps.

The modified polyether polyol can then be reacted in conventional ways with a reactive isocyanate to produce a polyurethane polymer that exhibits improved fire resisting qualities when compared to polyurethane polymer made from unmodified polyether polyol. If a foamed polymer is desired, a conventional blowing agent may be added at the time of polymer formation. Water, $CCl_3F$, $CCl_2F_2$, and combinations of these materials are examples of conventional blowing agents that expand during polymerization of the polyurethane to form the cells of the foamed polymer. Polymerization may require a catalyst, typically a tertiary amine, an organic stannous salt, or a mixture of such catalysts. Surfactants may be employed to affect the size of the cells formed by the blowing agent.

As is discussed above, polyurethane foams are flammable unless relatively expensive flame retardants are added to them. However, use of the modified polyether polyol of the invention improves the fire resistant qualities of polyurethane polymer produced from it. Foams made from the polymer prove to be self-extinguishing without any added flame retardant. When relatively small amounts of phosphorus or halogen containing flame retardants are added, such foams may even be made non-burning. Foam made with the modified polyether polyol of the invention is not powdery. The urea is not dissolved or mechanically dispersed in the polymer. It is chemically bound, becoming a part of the polymer itself, as is discussed below.

Urea modified polyether polyols were made with both maltose and lactose, as is shown in the examples below. The results obtained with those two sugars indicate that other appropriate reducing sugars such as glucose and galactose could also be successfully used. The preferred reducing sugar is lactose.

Lactose is an inexpensive and available byproduct of the cheese making industry, forming as it does an important ingredient in whey. Pure lactose may be used as a reducing sugar in the method of the invention. However, even without removal of non-lactose materials, whey contains large amounts of lactose. The lactose is mixed with proteins and other soluble and suspended materials in the whey. If the whey is subjected to ultrafiltration or comparable conventional separation techniques, much protein may be removed. The remaining aqueous solution of lactose and other disolved materials is called whey permeate. It is conventional in the cheese making industry to dry both whey and whey permeate to a powder form. With either whey or whey permeate, the resulting material is predominantly lactose and may be used directly in the method of the invention. Furthermore, propoxylation of the unpurified, whey permeate lactose, (the step of reacting a reducing sugar with propylene oxide referred to above) is observed to be faster than that undergone by the pure sugar.

It is known that the materials removed from whey to make whey permeate do not interfere with the production of polyurethane foams. See Richardson et al, U.S. Pat. Nos. 3,629,162 and 3,658,731. Therefore the reactions shown to be feasible using whey permeate indicate that whey could also be successfully used.

Propoxylation is the conventional method of preparing polyether polyols from a sugar. The process requires the reaction of the sugar and propylene oxide under basic conditions and preferably under elevated pressures at a modestly elevated temperature. The reaction can be carried on at temperatures from approximately 80° to 130° C. until the reaction is complete. A temperature of 120° C. is preferred, under which conditions the reaction has been observed to be complete for lactose in less than 20 hours under specified circumstances described in the examples set forth below.

Heating lactose under basic conditions causes side reactions to occur, as is noted above. The side reactions yield the colored compounds that darken the polyether polyol preparation resulting from the main reaction. The side reactions to be expected under such conditions in a reducing sugar such as lactose having an acidic alpha hydrogen next to an aldehydic moiety include aldol condensations. The aldol condensation products are carbonyl-containing. They and other thermal degradation products of a reducing sugar themselves exhibit a reducing nature. As is indicated below, the reaction of urea with a polyether polyol seems to be a reaction with carbonyl containing compounds mixed with or incorporated in the polyether polyol. Thus, the thermal degradation experienced by reducing sugars such as lactose that is normally considered adverse is turned to good advantage in the method of the invention. Aldol condensation products would not be expected in polyether polyols made from nonreducing sugars such as sucrose. Indeed, a sucrose-based polyether polyol and a lactose-based polyether polyol were each subjected to carbonyl analysis using the method of Lappin and Clark, "Colorimetric method for determination of traces of carbonyl compounds." Anal. Chem., Vol. 23, p. 541 (1951). The lactose-based material provided to have over 15 times the carbonyl concentration of the sucrose-based material.

The polyether product of propoxylation of reducing sugars is generally a liquid having a viscosity that varies with the sugar employed. The polyether polyol produced from lactose (whether pure lactose or lactose incorporated in whey permeate) is a relatively low viscosity liquid when compared to the sucrose-based polyol commonly used in the commercial production of polyurethane polymer. This low viscosity is a desirable characteristic that makes more convenient any fluid handling or processing, speeding transfer times, reducing strain on pumps, facilitating filtration, and so forth.

The disclosed polyether polyol made from a reducing sugar may be reacted with urea to produce a urea-modified polyether polyol. Urea and the unmodified polyether polyol are mixed in a reaction vessel that may be left open to the air. The reaction mixture is stirred vigorously and heated to a temperature approximately at or above 100° C. until the reaction is complete. Excessive heating should be avoided in that a black precipitate eventually begins to form. Furthermore, polyurethane foams made from a modified polyether polyol exhibit generally inferior qualities when the modified polyether polyol has been subjected to excessive heating. When lactose-based polyether polyol was heated with powdered urea to 110° C., a 15-minute reaction period was found to be satisfactory, during which time ammonia and water were evolved. After the reaction is sufficiently complete, the reaction mixture is removed from the heat and cooled quickly to room temperature with stirring. Any solids remaining may be filtered out or removed by other conventional means.

The modified polyether polyol exhibits a marked increase in viscosity as compared to the starting material. However, when the polyether polyol so modified is a lactose-based material, the modified polyether polyol remains considerably less viscous than commercial sucrose-based polyether polyols. As is described below, modified and unmodified lactose-based polyether polyols were tested for the presence of volatile carbonyls. It was found that the unmodified polyether polyol contained considerable amounts of volatile carbonyls, while none were detected in the urea-modified polyether polyol. The increase in viscosity noted above suggests that polymerization or other chemical reactions had occurred. The reduction in the number of carbonyls in the process of urea modification suggests that the urea reacted with carbonyl-containing compounds in the lactose-based polyether polyol. No urea was observed to recrystalize or otherwise separate from the modified polyether polyol upon its being held at room temperature.

Attempts were made to react urea and a conventional sucrose polyether polyol ("CHEMPOL" supplied by the Freeman Chemical Company). These attempts were unsuccessful. The urea was observed to dissolve in the polyether polyol and to remain dissolved while the material was hot. However, upon cooling, urea precipitated from the polyether polyol as needle-shaped crystals. The relative absence of carbonyl groups in the sucrose polyether polyol, referred to above, may explain the apparent inability of urea to react with the sucrose-based polyether polyol.

As will be discussed below, flame retardancy in a polyurethane polymer made from a urea modified polyether polyol is related to the amount of urea present in the polymer. The optimum concentration of urea in the polymer has been found to lie between 4 to 6% by weight. Lower concentrations of urea remain beneficial, but flame retardancy is perceptibly reduced. Higher urea concentrations remain beneficial. However, at a point that varies from sugar to sugar and mixture to mixture and that depends further on the experience of the sugar during the propoxylation step, excess urea fails to react with the polyether polyol and simply precipitates from the reaction mixture upon cooling. It has been found possible to incorporate sufficient urea into the modified polyether polyol to yield final concentrations of urea at least as high as 6% in the polyurethane polymer.

Polyurethane foams were prepared from urea modified polyether polyols produced both from purified lactose and from lactose contained in whey permeate. For experimental purposes one shot rigid polyurethane foams were prepared using p,p'-diphenylmethane diisocyanate (obtained under the trademark "MONDUR" from the Freeman Chemical Company.) However, other methods of preparing polyurethane foams, such as conventional prepolymer or quasi-prepolymer methods, or methods utilizing other isocyanates would be equally effective.

EXAMPLE 1

A polyether polyol was prepared by reacting dried whey permeate and propylene oxide in the presence of KOH. The dried whey permeate contained approximately 9.5% $H_2O$ by weight. Whey permeate and propylene oxide were mixed in a 1:3.67 weight ratio and KOH was added in an amount sufficient to constitute approximately 0.01% of the total weight of the mixture. These ingredients were reacted in an air-tight reactor at 120° C. with vigorous stirring for approximately 16 hours. The product obtained was a reddish-brown liquid with a viscosity around 200 cps and hydroxyl number of 410 per 100 gm of material, an acid number of 3.3 per 100 gm of material, and a pH of 6.2. The ash content of the polyether polyol was found to be 0.008%. Then 22.4 gm of the polyether polyol so prepared was placed together with 2.3 gm of powdered urea in a 100 ml erlenmeyer flask. The material was stirred vigorously and heated to 110° C. for 15 minutes. $NH_3$ and water were observed to be evolved during reaction. The reaction mixture was then cooled promptly to room temperature while stirring was continued. Solid materials, probably consisting of unreacted urea, were filtered out through cheese cloth. The remaining urea-modified polyether polyol exhibited an increased viscosity, probably indicating that some kind of polymerization reaction had occurred.

The modified polyether polyol was tested for the presence of volatile carbonyls or their chemical precursors. A crucible containing the modified polyether polyol and a second crucible containing a sample of the polyether polyol that had not been reacted with urea each were covered with filter paper that had been dipped in a solution containing 10% acetic acid and 10% aniline. The crucibles were then heated and the filter paper was examined for the development of color. After 5 minutes of heating, a yellow coloration was observed on the filter paper covering the crucible containing unmodified polyether polyol. No such coloration was observed on the filter paper covering the urea-modified polyether polyol. It will be noted that an excess of acetic acid had been added to the aniline solution to neutralize the effect of any $NH_3$ released upon heating the urea-modified polyether polyol. These observations indicate that urea had become chemically bound by reaction with carbonyl containing compounds in the process of manufacturing the modified polyether polyol. the observations were confirmed by comparing the reactions of modified and unmodified polyether polyol with 2,4-dinitrophenyl hydrazine. Carbonyl moeities were observed to condense with the hydrazine in the unmodified polyether polyol, whereas a comparable reaction did not occur with the urea-modified polyether polyol.

EXAMPLE 2

A urea-modified polyether polyol was prepared under the reaction conditions and utilizing the reagents of Example 1 in substantially the same relative quantities with pure lactose substituted for the whey permeate of Example 1. The reaction products resulting generally exhibited the same characteristics as the reaction products of Example 1.

EXAMPLE 3

A polyether polyol was produced by reaction with propylene oxide in the presence of KOH in the manner set forth in Example 1 with maltose being substituted for the whey permeate of Example 1. 22.4 ml of the polyether polyol was then reacted with 2.9 gm of urea in a 100 ml erlenmeyer flask by heating the ingredients at 110° C. for 15 minutes with vigorous stirring. On cooling, the reaction product was observed to be a viscous liquid. The liquid was observed to yield no precipitate of urea even after long standing.

EXAMPLE 4

An attempt was made to react urea and a sucrose-based polyether polyol in the same manner in which the whey permeate-, lactose-, and maltose-based polyether polyols of Examples 1, 2, and 3 had been reacted with urea to produce modified polyether polyols. The sucrose-based polyether polyol used was one commercially available and sold under the trademark "CHEMPOL" by the Freeman Chemical Company. Upon heating and stirring in accord with the method described in Example 1, the urea was observed to dissolve in the hot foaming is perceivably initiated. "Rise time" is the time at which full extension of the foam has been achieved. "Tac-free time" is that time at which the foam is no longer tacky upon being touched. Each foam was tested for its density, the percentage of closed cells contained therein, and its compressive strength. The amounts of ingredients used and the results of the tests and observations are recorded in Table 1, below.

TABLE 1

| Ingredient | Formulation | | | | |
| --- | --- | --- | --- | --- | --- |
| | I | II | III | IV | V |
| sucrose polyether polyol | — | — | 80 gm | — | — |
| lactose polyether polyol (from whey permeate) | 100 gm | — | — | 80 gm | — |
| urea-modified lactose polyether polyol (from whey permeate) | — | 100 gm | — | — | 88.3 gm |
| phosphorus-containing flame retardant | — | — | 20 gm | 20 gm | 11.7 gm |
| blowing agent ($CCl_2F_2$) | 30 ml | 30 ml | 30 ml | 30 ml | 30 ml |
| silicone surfactant | 2 ml | 2 ml | 2 ml | 2 ml | 2 ml |
| amine catalyst | 1.33 ml | 1.33 ml | 2 ml | 2 ml | 1.5 ml |
| p,p'-diphenyl-methane diisocyanate | 130 gm | 130 gm | 120 gm | 120 gm | 120 gm |
| cream time | 20 sec. | 20 sec. | 40 sec | 20 sec | 20 sec |
| rise time | 40 sec | 40 sec | 165 sec | 40 sec | 45 sec |
| tac-free time | 60 sec | 80 sec | 180 sec | 100 sec | 95 sec |
| density | 3.5 lb/ft$^3$ | 3.5 lb/ft$^3$ | 3.65 lb/ft$^3$ | 3.70 lb/ft$^3$ | 3.6 lb/ft$^3$ |
| % closed cell | 90% | 90% | 89% | 89% | 90% |
| compressive strength | 66 psi | 65 psi | 71 psi | 62 psi | 72 psi |
| burn classification | not self-extinguishing | self-extinguishing | non-burning | non-burning | non-burning |
| ASTM 1692-68T test, inches burned | 6 in | 2.5 in | 0.95 in | 0.95 in | 0.95 in | polyether polyol. However, upon cooling, the urea was observed to precipitate as needle-shaped crystals. No changes were observed in the sucrose-based polyether polyol that suggested any chemical binding between the polyether polyol and the urea.

The modified polyether polyol of Example 1 and the unmodified lactose-based polyether polyol referred to as an intermediate reaction product in Example 1 were used to prepare one shot, rigid polyurethane foams. Polyurethane polymer was generated by reacting the polyether polyols with p,p'-diphenylmethane diisocynate (available under the trademark "MONDUR" sold by the Freeman Chemical Company). A commercially available amine catylist available under the trademark "DABCO 8020" was also used. The polymer so generated was foamed by the addition of a blowing agent ($CCl_2F_2$), and a silicone surfactant was used to affect the cell structure of the resulting foam. The surfactant used was a commercial preparation sold under the trademark "DC 193". Foams were made both with and without the addition of a conventional phorphorus-containing flame retardant. The flame retardant used was a commercial preparation sold by the Freeman Chemical Company under the trademark "ANTIBLAZE 80". A comparable foam was made using the sucrose-based polyether polyol referred to in Example 4. Each of the foams was cut into a block having the dimensions 2"×6" by ½". The ASTM 1692-68T test for flame retardancy was then performed on the blocks of foam.

The foaming reactions were observed and the cream time, rise time, and tac-free time were recorded in each instance. "Cream time" is defined as that time at which It will be readily apparent to those skilled in the art that a number of modifications and changes can be made without departing from the spirit and scope of the present invention. Therefore, it is not intended that the invention be limited by the illustrative examples but only by the claims, which follow:

What is claimed is:

1. A method for making a modified polyether polyol for use in the manufacture of polyurethane polymer having improved fire-resisting qualities, comprising the steps of:
   (a) reacting a reducing sugar with propylene oxide to produce a polyether polyol; and
   (b) reacting the polyether polyol with urea to chemically bind the urea thereto to produce a modified polyether polyol.

2. The method of claim 1 wherein the reducing sugar is a sugar selected from the group consisting of lactose, maltose, glucose, galactose, and mixtures thereof.

3. The method of claim 1 in which the step of reacting the polyether polyol with urea includes mixing urea with the polyether polyol to produce a mixture containing from 5 to 15% by weight of urea and heating the mixture to a temperature between 95° C. and 120° C. until the urea has reacted with the polyether glycol.

4. The method of claim 3 wherein the reducing sugar is a sugar selected from the group consisting of lactose, maltose, glucose, galactose, and mixtures thereof.

5. The method of claim 1 wherein the reducing sugar is lactose contained in whey and the method of the invention includes, before the step of reacting a reducing sugar with propylene oxide, the step of preparing dried whey containing lactose having a moisture content from 0 to 15% by weight.

6. The method of claim 1 wherein the reducing sugar is lactose contained in whey permeate and the method includes, before the step of reacting a reducing sugar with propylene oxide, the steps of:
   (a) removing whey proteins from whey to produce a whey permeate of reduced protein content; and
   (b) removing water from the whey permeate to produce a dry whey permeate containing lactose having a water content from 0 to 15% by weight.

7. The modified polyether polyol produced by the method of claim 1.

8. A modified polyether polyol for use in the manufacture of polyurethane polymer having improved fire resisting qualities comprising polyether polyol having urea chemically bound thereto.

9. The modified polyether polyol of claim 8 wherein the weight percent of urea is from 5 to 15%.

10. A method for making a polyurethane polymer having improved fire resisting qualities comprising the steps of:
    (a) reacting or reducing sugar with propylene oxide to produce a polyether polyol;
    (b) reacting the polyether polyol with urea to chemically bind the urea thereto to produce a modified polyether polyol;
    (c) reacting the modified polyether polyol with a reactive polyisocyanate to produce a polyurethane polymer.

11. The method of claim 10 wherein the step of reacting the modified polyether polyol with a reactive polyisocyanate to produce a polyurethane polymer includes foaming the polyurethane polymer as it is produced to make a foamed polyurethane polymer having improved fire resisting qualities.

12. The method of claim 10 wherein the reducing sugar is a sugar selected from the group consisting of lactose, maltose, glucose, galactose, and mixtures thereof.

13. The method of claim 10 wherein the reducing sugar is lactose contained in whey and the method of the invention includes, before the step of reacting a reducing sugar with propylene oxide, the step of preparing dried whey containing lactose having a moisture content from 0 to 15% by weight.

14. The method of claim 10 wherein the reducing sugar is lactose contained in whey permeate and the method includes, before the step of reacting a reducing sugar with propylene oxide, the steps of:
    (a) removing whey proteins from whey to produce a whey permeate of reduced protein contents;
    (b) removing water from the whey permeate to produce a dry whey permeate containing lactose having a water content from 0 to 15% by weight.

15. The method of claim 10 in which the step of reacting the polyether polyol with urea includes mixing urea with the polyether polyol to produce a mixture containing from 5 to 15% by weight of urea and heating the mixture to a temperature between 95° C. and 120° C. until the urea has reacted with the polyether polyol.

16. The method of claim 15 wherein the reducing sugar is a sugar selected from the group consisting of lactose, maltose, glucose, galactose, and mixtures thereof.

17. The polyurethane polymer produced by the method of claim 10.

18. The foamed polyurethane polymer having improved fire resisting qualities produced by the method of claim 11.

* * * * *

UNITED STATES PATENT AND TRADEMARK OFFICE
CERTIFICATE OF CORRECTION

PATENT NO. : 4,459,397
DATED : July 10, 1984
INVENTOR(S) : Richardson et al.

It is certified that error appears in the above–identified patent and that said Letters Patent are hereby corrected as shown below:

At column 4, line 32, cancel "provided" and substitute therefor --proved--.

In the Claims at column 8, line 63, cancel "glycol" and substitute therefor --polyol--.

Signed and Sealed this

Twenty-seventh Day of November 1984

[SEAL]

Attest:

Attesting Officer

GERALD J. MOSSINGHOFF

Commissioner of Patents and Trademarks